(12) United States Patent
Lee et al.

(10) Patent No.: US 8,328,885 B2
(45) Date of Patent: Dec. 11, 2012

(54) FUEL REFORMER BURNER OF FUEL CELL SYSTEM

(75) Inventors: Hyun-chul Lee, Hwaseong-si (KR);
Nobuya Kanamaru, Tokyo (JP);
Takami Higashi, Suwon-si (KR);
Kang-hee Lee, Suwon-si (KR);
Doo-hwan Lee, Suwon-si (KR); Shigeru Hayashi, Tokyo (JP); Noriaki Watanabe, Tokyo (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 12/608,140

(22) Filed: Oct. 29, 2009

(65) Prior Publication Data

US 2010/0136378 A1    Jun. 3, 2010

(30) Foreign Application Priority Data

Dec. 2, 2008  (KR) .................. 10-2008-0121281

(51) Int. Cl.
*B01J 7/00* (2006.01)
*B01J 8/00* (2006.01)
*C01B 6/24* (2006.01)
*F23Q 9/00* (2006.01)

(52) U.S. Cl. ............ 48/61; 422/625; 423/644; 431/278; 431/285

(58) Field of Classification Search ...... 48/61; 431/278, 431/285
See application file for complete search history.

(56) References Cited

U.S. PATENT DOCUMENTS

| 2006/0191200 A1* | 8/2006 | Maenishi et al. ............ 48/127.9 |
| 2007/0028522 A1* | 2/2007 | Mizusawa et al. ........... 48/127.9 |
| 2007/0266633 A1* | 11/2007 | Tsangaris et al. ........... 48/197 R |

FOREIGN PATENT DOCUMENTS

| JP | 2005-294127 | 10/2005 |
| JP | 2006-236831 | 9/2006 |
| JP | 2007-257923 | 10/2007 |
| JP | 2007-261828 | 10/2007 |

* cited by examiner

*Primary Examiner* — Matthew Merkling
(74) *Attorney, Agent, or Firm* — Stein McEwen, LLP (57) ABSTRACT

A fuel reformer burner in which fuel gas and anode-off-gas (AOG) may be burned and backfire may be prevented during combustion of AOG includes a fuel supply portion, an anode-off-gas (AOG) supply portion; and a combustion air supply portion. The fuel supply portion and the AOG supply portion are arranged inside the combustion air supply portion, which is formed to extend beyond the discharge sides of the fuel supply portion and the AOG supply portion.

7 Claims, 6 Drawing Sheets

FUEL REFORMER BURNER OF FUEL CELL SYSTEM

CROSS-REFERENCE TO RELATED APPLICATIONS

This application claims the benefit of Korean Patent Application No. 2008-121281, filed on Dec. 2, 2008, in the Korean Intellectual Property Office, the disclosure of which is incorporated herein in their entirety by reference.

BACKGROUND

1. Field

Exemplary embodiments relate to a burner to heat a fuel reformer that generates hydrogen, and more particularly, to a fuel reformer burner in which fuel gas and anode-off-gas (AOG) that are not used in a fuel cell stack and that pass through the fuel cell stack may be burned so that combustion efficiency is enhanced.

2. Description of the Related Art

Fuel cells are power generation systems which directly convert chemical energy into electrical energy through a chemical reaction between hydrogen and oxygen. Hydrogen is contained in a hydrocarbon-based material, such as methanol, ethanol, or natural gas.

Polymer electrolyte membrane fuel cell (PEMFC) systems are high-efficiency next-generation power generation systems which produce electricity and heat through an electrochemical reaction between hydrogen and air. Such fuel cell systems include a fuel cell stack and a fuel processing unit as main elements and a fuel tank and a fuel pump as auxiliary elements. The fuel cell stack has a configuration in which several to several tens of unit cells, each unit cell including a membrane electrode assembly (MEA) and a separator, are stacked. The fuel processing unit includes a fuel reformer, a shift reactor, and a carbon monoxide (CO) remover.

Hydrogen generated in the fuel processing unit is supplied to anodes of a PEMFC stack and reacts with oxygen supplied to a cathode to produce electricity.

A reforming reaction in a fuel reformer is performed at a high temperature. Thus, the fuel processing unit includes a fuel reformer burner to supply heat to the fuel reformer.

The fuel reformer burner burns fuel gas and produces heat. In this case, the fuel gas mainly consists of hydrocarbon gas, such as methane gas. However, in order to improve the efficiency of the PEMFC systems, the fuel reformer burner burns not only fuel gas, such as hydrocarbons, but also hydrogen gas. In other words, a unit for burning the hydrogen gas contained in an anode-off-gas (AOG) is provided because generally about 70% to about 85% of the hydrogen gas is reacted in the PEMFC stack, and the hydrogen fuel that is not reacted within the PEMFC stack is discharged out of the PEMFC stack and is discarded. Thus, when the hydrogen fuel is recovered and used as fuel in a burner for the fuel processing unit, the efficiency of the entire power generation system may be increased.

In addition, when the fuel processing unit is started, a large amount of CO is contained in hydrogen gas for several tens of minutes until the fuel processing unit reaches a normal operating state, thus this hydrogen gas is not supplied to the PEMFC stack. This is because a large amount of CO acts as poison to an MEA catalyst. As a method of utilizing hydrogen gas having a high concentration of CO, the hydrogen gas may be used as fuel gas for the fuel reformer burner. This helps reducing energy consumption when a fuel cell operates.

Thus, in order to enhance the efficiency of fuel cell systems, there is a need for a burner in which hydrogen gas contained in the AOG as well as fuel gas such as hydrocarbon is burned. To this end, there is a need for a burner in which both types of fuel (fuel gas and hydrogen gas) may be efficiently and safely burned.

In the related art, air and AOG are simultaneously mixed in a fuel inlet of the fuel reformer burner. However, the flame speed of hydrogen during combustion is very high compared to the flame speed of the fuel gas, i.e., about ten times faster than that of methane. Thus, the flame may travel upstream or opposite to a direction in which a fuel flows, which may cause an explosion.

SUMMARY

Exemplary embodiments include a fuel reformer burner in which both fuel gas and anode-off-gas (AOG) may be burned and backfire may be prevented during combustion of AOG.

Additional aspects will be set forth in part in the description which follows and, in part, will be apparent from the description, or may be learned by the practice thereof.

Exemplary embodiments may include a fuel reformer burner including: a fuel supply portion to which a fuel for the fuel reformer is supplied and from which the fuel is discharged into the fuel reformer burner, the fuel being discharged from a discharge side of the fuel supply portion; an anode-off-gas (AOG) supply portion to which the AOG is supplied from a fuel cell stack and from which the AOG is discharged into the fuel reformer burner, the AOG being discharged from a discharge side of the AOG supply portion; and a combustion air supply portion to which combustion air is supplied and from which the combustion air is discharged into the fuel reformer burner, wherein the fuel supply portion and the AOG supply portion are arranged inside the combustion air supply portion, and the combustion air supply portion is formed to extend beyond the discharge sides of the fuel supply portion and the AOG supply portion.

Exemplary embodiments may include a plurality of first air supply holes being formed in a circumference of an internal surface of the combustion air supply portion at a first position that is close to the discharge side of the fuel supply portion, and a plurality of second air supply holes is formed in a circumference of the internal surface of the combustion air supply portion at a second position that is separated from the first position and that is farther away from the discharge side of the fuel supply portion.

Exemplary embodiments may include that the fuel reformer burner further includes supply portions formed at the plurality of the first air supply holes and the plurality of the second air supply holes to supply a flow of air toward an inside of the combustion air supply portion.

Exemplary embodiments may include the supply portions being formed at an angle of about 25° to about 60° with reference to a tangent line tangent to the combustion air supply portion at a portion thereof at which the supply portions are formed.

Exemplary embodiments may include the AOG supply portion being arranged inside the fuel supply portion, and a plurality of discharge holes being formed in each of the discharge side of the AOG supply portion and the discharge side of the fuel supply portion.

Exemplary embodiments may include the discharge side of the AOG supply portion being formed at a same height as the discharge side of the fuel supply portion, and the discharge holes of the AOG supply portion and the discharge holes of the fuel supply portion may be arranged in a circle.

Exemplary embodiments may include the fuel reformer burner further includes: a flange fixed on an outer circumference of the combustion air supply portion; and a screw coupling unit connected to the flange to fix a distance between the flange and a fuel reformer housing.

Additional aspects and/or advantages will be set forth in part in the description which follows and, in part, will be obvious from the description, or may be learned by the practice thereof.

BRIEF DESCRIPTION OF THE DRAWINGS

These and/or other aspects and advantages will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below in order to explain aspects thereof by referring to the figures.

Figure 1:
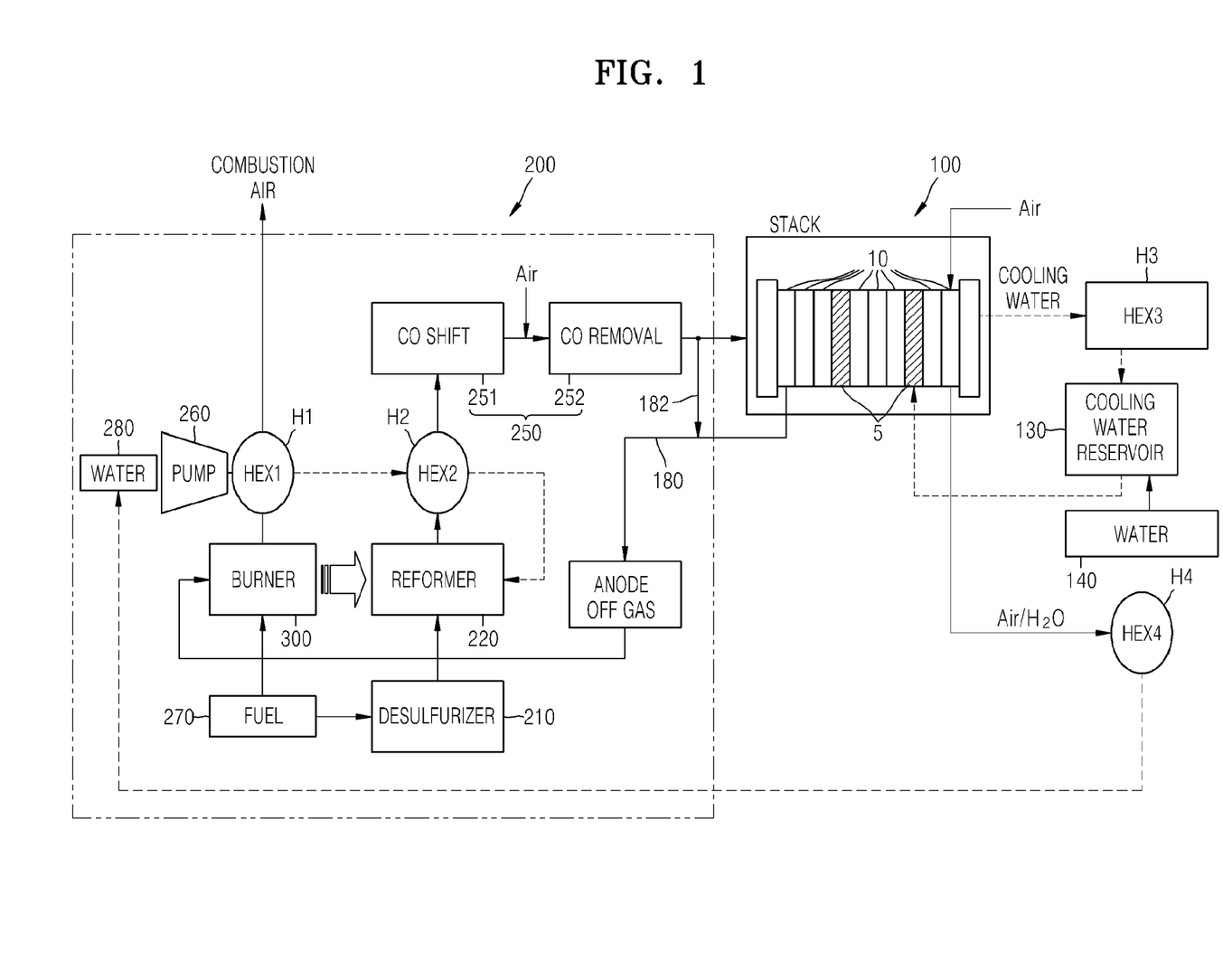
FIG. 1 illustrates a configuration of a polymer electrolyte membrane fuel cell (PEMFC) system in which a fuel reformer burner according to an exemplary embodiment is used.

FIG. 1 illustrates a configuration of a polymer electrolyte membrane fuel cell (PEMFC) system in which a fuel reformer burner according to an exemplary embodiment is used. Referring to FIG. 1, the PEMFC system includes a fuel processing unit 200, a fuel cell stack 100, and a cooling system to cool the fuel cell stack 100.

The fuel processing unit 200 includes a desulfurizer 210, a fuel reformer 220, a fuel reformer burner 300, a water supply pump 260, first and second heat exchangers H1 and H2, and a CO removal unit 250 including a shift reactor 251 and a carbon monoxide (CO) remover 252.

Hydrocarbon-based gas used as a fuel source from a fuel tank 270 and water vapor from a water tank 280 via the water supply pump 260 and the first and second heat exchangers H1 and H2 react with each other in the fuel reformer 220 to generate hydrogen. The fuel reformer 220 is heated by the fuel reformer burner 300. In this case, carbon dioxide ($CO_2$) and CO are generated as byproducts. When a hydrogen fuel in which CO is mixed is supplied to the fuel cell stack 100, an electrode is poisoned, and the performance of a fuel cell may be degraded. Thus, the content of CO is reduced by arranging the shift reactor 251 and the CO remover 252 at an outlet of the fuel reformer 220. A reaction in which CO and water vapor react with each other and $CO_2$ is generated is performed in the shift reactor 251. A reaction in which CO is directly oxidized due to oxygen is performed in the CO remover 252.

The desulfurizer 210 is arranged at an inlet of the fuel reformer 220 and removes sulfur contained in the fuel source.

Water that is supplied to the first and second heat exchangers H1 and H2 from the water supply pump 260 is heat with combustion gas discharged by the fuel reformer burner 300 and reformer gas discharged by the fuel reformer 220, respectively.

A plurality of unit cells 10 is stacked in the PEMFC stack 100. Each of the unit cells 10 includes a cathode and an anode having an electrolyte membrane disposed therebetween. Separators are installed between the unit cells 10, and a flow path in which an oxidizer or hydrogen gas flows corresponding to each electrode is formed in the separator.

Cooling plates 5 is installed at the PEMFC stack 100. One of the cooling plates 5 through which cooling water for heat exchange passes is installed every several unit cells 10 in the PEMFC stack 100. The cooling water absorbs heat generated in the PEMFC stack 100 while passing along a flow path of the cooling plate 5, and the absorbed heat of the cooling water is dissipated by a heat exchanger H3 by secondary cooling water, and then is recirculated into the PEMFC stack 100 through a cooling water reservoir 130.

End plates are installed on both ends of the PEMFC stack 100. A supply hole and a recovery hole for oxygen (air) and a supply hole and a recovery hole for fuel (hydrogen gas) are formed in at least one of the end plates. In addition, a supply hole and a recovery hole for cooling water are formed in at least one of the end plates. Holes corresponding to the holes for oxygen, fuel, and cooling water are formed in the cooling plates 5, the unit cells 10, and the separators. Gas containing unreacted hydrogen discharged from the fuel (hydrogen gas) recovery hole may be referred to as anode-off-gas (AOG).

A cooling medium stored in the cooling water reservoir 130 in a liquid state is supplied to the cooling plates 5 within the PEMFC stack 100, absorbs heat generated in the PEMFC stack 100, is changed into a gas state, escapes from the PEMFC stack 100, is cooled through heat exchange with the secondary cooling water supplied by the heat exchanger H3 from a water tank 140, and then is recovered to the cooling water reservoir 130.

Air and water vapor which are discharged from the cathode of the PEMFC stack 100 become water in a heat exchanger H4 and are recovered to the water tank 280.

Because a large amount of CO is contained in hydrogen gas that is generated by the CO removal unit 250 when the fuel processing unit is initially started, the hydrogen gas is not adequate to use as a reacting material for the fuel cell. However, such hydrogen gas may be recovered and used as fuel for the fuel reformer burner 300. To this end, an AOG supply pipe 180 is connected to a rear end of the PEMFC stack 100, and a hydrogen bypass pipe 182 is installed between the PEMFC stack 100 and the CO remover 252 and supplies gas containing the initially-generated hydrogen to the fuel reformer burner 300. The hydrogen bypass pipe 182 may be connected to the AOG supply pipe 180.

Figure 2:
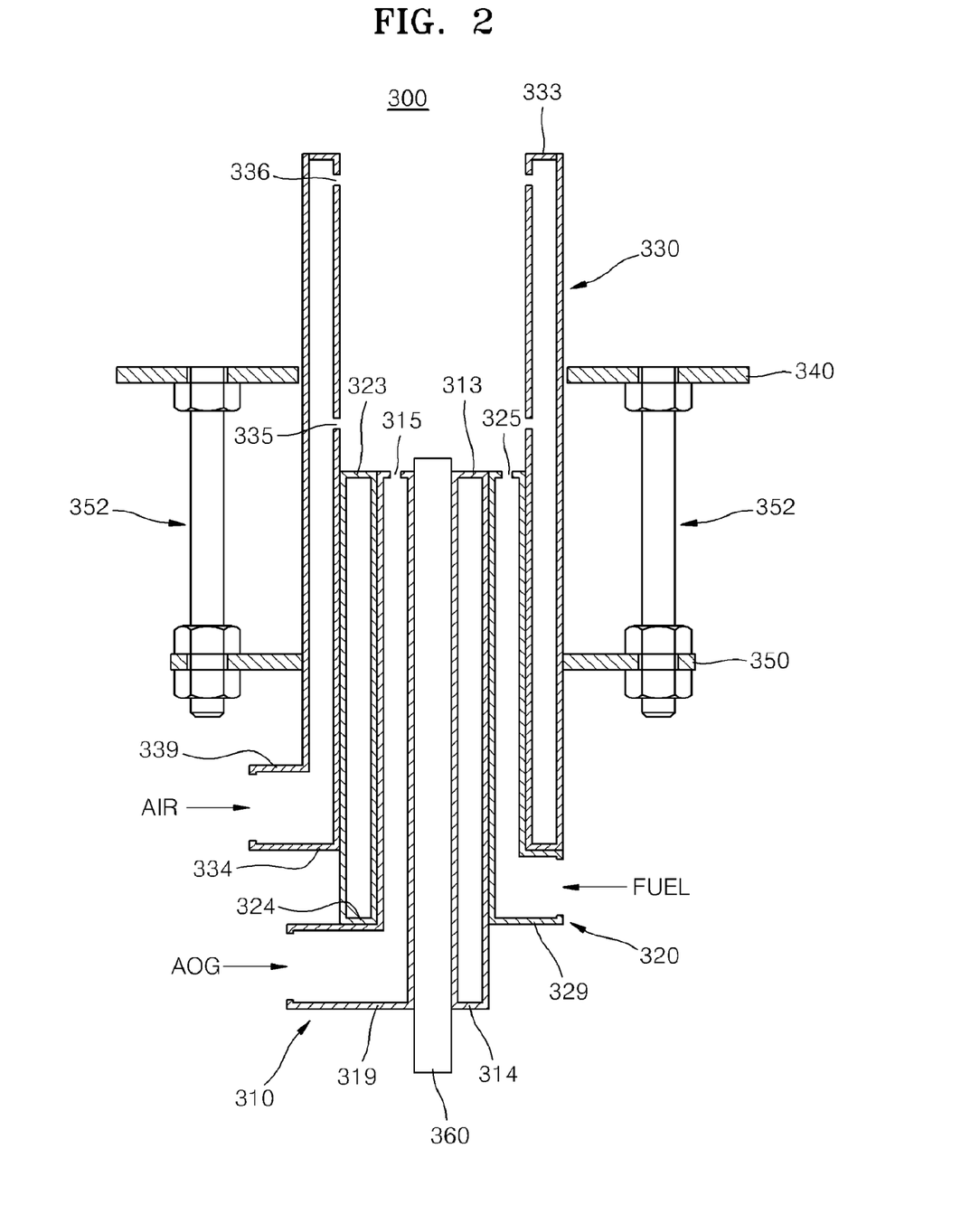
FIG. 2 is a cross-sectional view illustrating a structure of the fuel reformer burner according to an exemplary embodiment.
Figure 3:
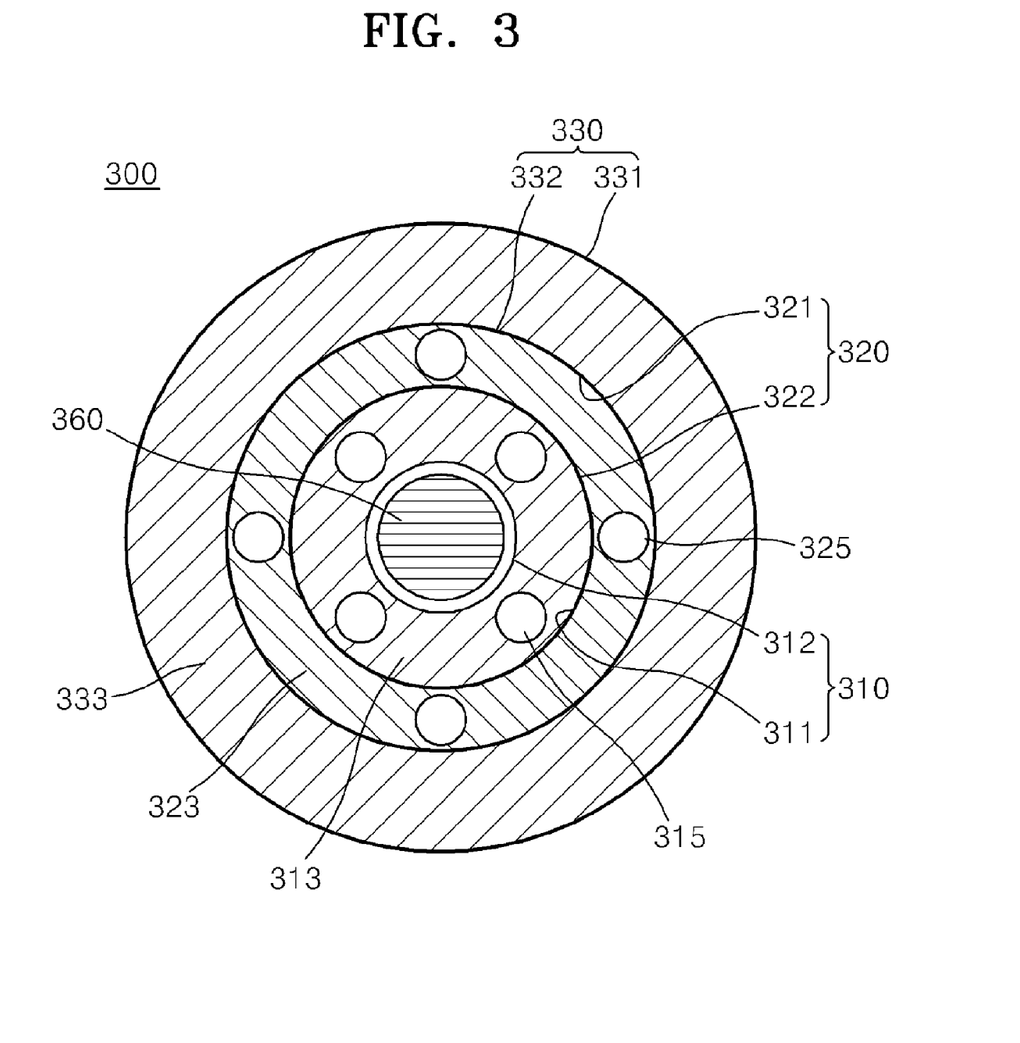
FIG. 3 is a partial plan view of the fuel reformer burner of FIG. 2.

FIG. 2 is a cross-sectional view illustrating a structure of the fuel reformer burner according to an exemplary embodiment. FIG. 3 is a partial plan view of the fuel reformer burner of FIG. 2.

Referring to FIGS. 2 and 3, the fuel reformer burner 300 includes an AOG supply portion 310 to which AOG is supplied, a fuel supply portion 320, and a combustion air supply portion 330. The fuel supply portion 320 is arranged inside the combustion air supply portion 330, and the AOG supply portion 310 is arranged inside the fuel supply portion 320. An electric igniter 360 is arranged inside the AOG supply portion 310. The combustion air supply portion 330, the fuel supply portion 320, and the AOG supply portion 310 are concentric tubes in the middle of which the electric igniter 360 is disposed. The tubes of the combustion air supply portion 330, the fuel supply portion 320, and the AOG supply portion 310 may be of different lengths. Adjacent external and internal tubes, described hereinafter, may be surfaces or walls of two different tubes or may be opposite sides of one wall of a tube.

When a predetermined voltage, e.g., a direct current (DC) voltage of 110 V, is applied to the electric igniter 360, an electric spark occurs at an end of the electric igniter 360, and the fuel gas is fired.

The combustion air supply portion 330 includes an external tube 331 and an internal tube 332 of which one end is a discharge side 333 and an opposite end is an entering side 334 of a combustion air supply path. An inlet 339 through which air, i.e., combustion air, is supplied from an air blower (not shown) is arranged at the external tube 331. The external tube 331 and the internal tube 332 are formed to extend farther than the AOG supply portion 310 and the fuel supply portion 320, i.e., discharge side 333 of the combustion air supply portion 330 extends beyond discharge sides 313 and 323 (described hereinafter) of the AOG supply portion 310 and the fuel supply portion 320, respectively, such that the discharge sides 313 and 323 of the AOG supply portion 310 and the fuel supply portion 320 are disposed inside of the combustion air supply portion 330.

A plurality of first air supply holes 335 and a plurality of second air supply holes 336 are formed in the internal tube 332. The plurality of first air supply holes 335 is disposed about a circumference of the internal tube 332 in a first position. The plurality of second air supply holes 336 is disposed about a circumference of the internal tube 332 in a second position. The first and second positions of the pluralities of the first and second air supply holes 335 and 336 are separated from one another in a direction in which fuel is discharged, i.e., the first air supply holes 335 are arranged in the first position close to a discharge side 323 of the fuel supply portion 320, and the second air supply holes 336 are arranged in the second position close to the discharge side 333 of the combustion air supply portion 330. Although not shown in FIG. 2, other air supply holes may be further formed between the first air supply holes 335 and the second air supply holes 336.

The fuel supply portion 320 includes an external tube 321 and an internal tube 322 of which one end is the discharge side 323 and an opposite end is an entering side 324 of a fuel supply path. An inlet 329 through which fuel gas is supplied from a fuel pump, i.e., a fuel supply unit, (not shown) is formed at the external tube 321. A portion in which the external tube 321 the fuel supply portion 320 and the internal tube 332 of the combustion air supply portion 330 overlap with each other may be the same portion, i.e., the external tube 321 of the fuel supply portion 320 and the internal tube 332 of the combustion air supply portion 330 may be two sides of one wall of a portion of a tube or a shared wall of portion of a tube. A plurality of fuel discharge holes 325 is formed at the discharge side 323 of the fuel supply portion 320.

The AOG supply portion 310 includes an external tube 311 and an internal tube 312 of which one end is a discharge side 313 and an opposite end is an entering side 314 of a fuel supply path. An inlet 319 through which AOG is supplied is arranged at the external tube 311. A portion in which the external tube 311 of the AOG supply portion 310 and the internal tube 322 of the fuel supply portion 320 overlap with each other may be the same portion, i.e., the external tube 311 of the AOG supply portion 310 and the internal tube 322 of the fuel supply portion 320 may be two sides of one wall of a portion of a pipe or a shared wall of portion of a pipe. A plurality of AOG discharge holes 315 is formed at the discharge side 313 of the AOG supply portion 310. The discharge sides 313 and 323 of the AOG supply portion 310 and the fuel supply portion 320, respectively, are aligned within the combustion air supply portion 330 such that the discharge sides 313 and 323 are disposed at a same distance from the discharge side 333 of the combustion air supply portion 330 inside the combustion air supply portion 330. An end of the electric igniter may be disposed closer to the discharge side 333 of the combustion air supply portion 330 than the discharge sides 313 and 323 of the AOG supply portion 310 and the fuel supply portion 320.

Further, the inlets 319, 329, and 339 respectively of the AOG supply portion 310, fuel supply portion 320, and the combustion air supply portion 330 may be staggered and bent such that the entering side 334 of the combustion air supply portion 330 may contact the inlet 329 of the fuel supply portion 320, and the entering side 324 of the fuel supply portion 320 may contact the inlet 319 of the AOG supply portion 310.

A first flange 340 and a second flange 350 are installed at an outer circumference of the external tube 331 of the combustion air supply portion 330. The combustion air supply portion 330 is movable from or detachably connected to the first flange 340. The first flange 340 is fixed on a fuel reformer housing (not shown). The second flange 350 is fixed on the external tube 331 of the combustion air supply portion 330. A screw coupling unit 352 is installed between the first flange 340 and the second flange 350 to fix the second flange 350 to the first flange 340, thereby fixing the fuel reformer burner 300 to the fuel reformer housing (not shown). The screw coupling unit 352 includes at least a screw and a bolt, the configurations of which may vary. The position of the fuel reformer burner 300 in the fuel reformer may be adjusted or fixed by the screw coupling unit 352. Thus, the position of the fuel reformer burner 300 may be adjusted depending on fuel supplied from the AOG supply portion 310 and the fuel supply portion 320 so that combustion efficiency may be increased.

The AOG supply portion 310, the fuel supply portion 320, and the combustion air supply portion 330 may be formed of a material having thermal endurance and oxidation resistance, for example, SUS 301 stainless steel.

Combustion gas that is supplied from the fuel supply portion 320 and the AOG supply portion 310 is primarily burned by oxygen that is supplied from the first air supply holes 335, and unburned gas is secondarily burned by oxygen that is supplied from the second air supply holes 336. Thus, combustion efficiency of the fuel reformer burner 300 may be increased.

Figure 4:
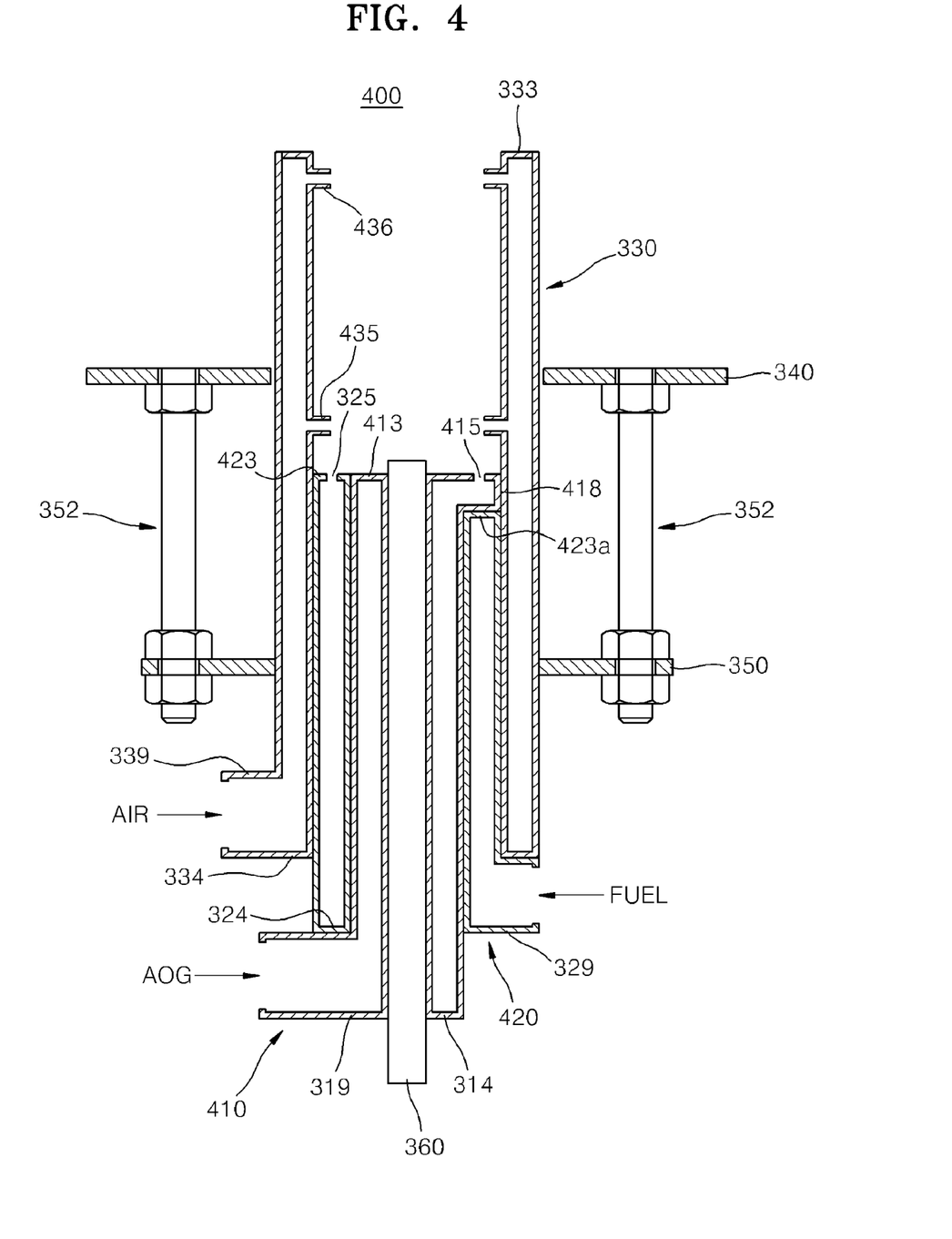
FIG. 4 is a cross-sectional view illustrating a structure of a fuel reformer burner according to an exemplary embodiment.
Figure 5:
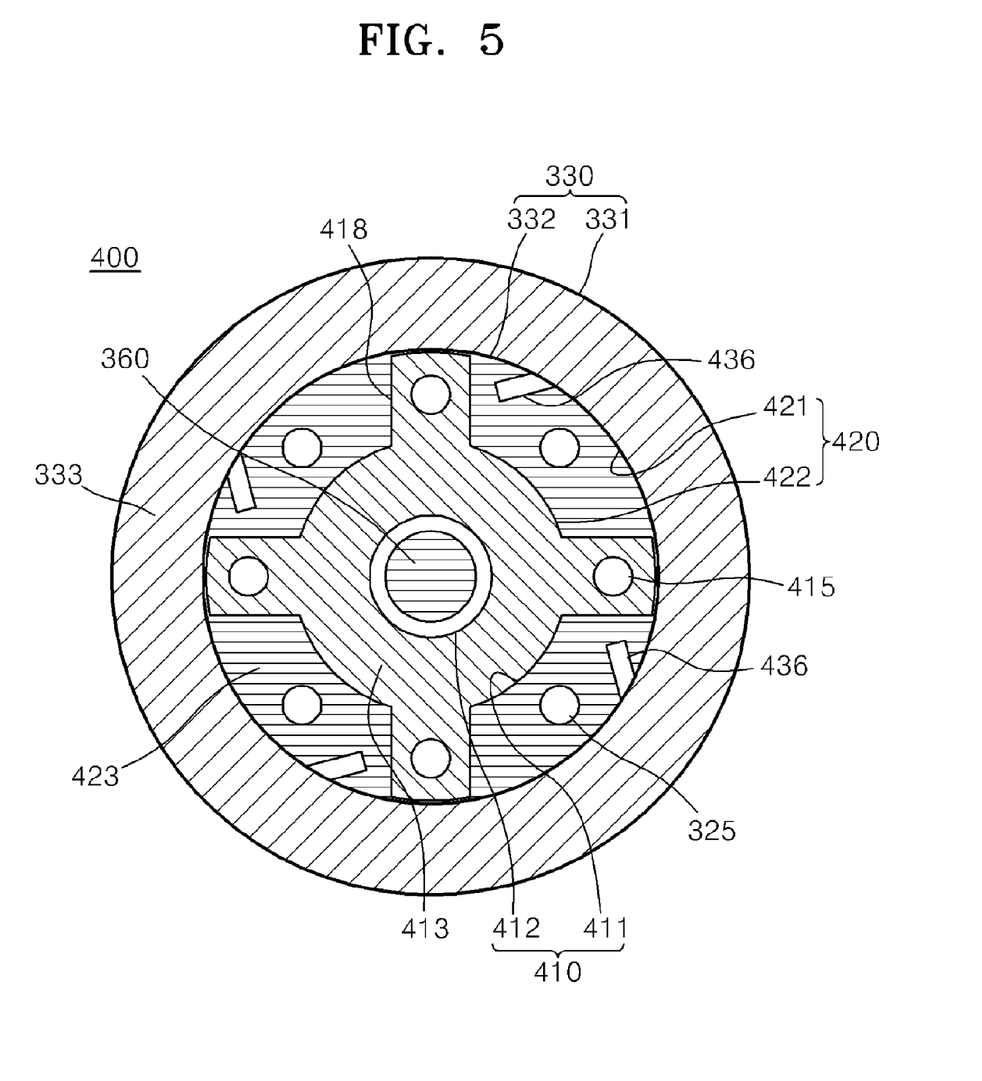
FIG. 5 is a partial plan view of the fuel reformer burner of FIG. 4.

FIG. 4 is a cross-sectional view illustrating a structure of a fuel reformer burner according to an exemplary embodiment. FIG. 5 is a partial plan view of the fuel reformer burner of FIG. 4. Same reference numerals are used for elements that are substantially the same as those of FIGS. 2 and 3 and thus, a detailed description thereof will be omitted.

Referring to FIGS. 4 and 5, a fuel reformer burner 400 includes an AOG supply portion 410 to which AOG is supplied, a fuel supply portion 420, and a combustion air supply portion 330. The AOG supply portion 410 includes an extended portion 418 which is extended over the fuel supply portion 420, and a discharge hole 415 is formed in the extended portion 418. The extended portions 418 are bent away from the electric igniter 360 and toward the combustion air supply portion 330 around a truncated discharge side portion 423a of the fuel supply portion 420 so that the discharge holes 325 and 415 respectively of the AIG supply portion 410 and fuel supply portion 420 are on a same plane within combustion air supply portion 330. A discharge side 423 of the fuel supply portion 420 and a discharge side 413 of the AOG supply portion 410 are formed at the same height in a direction in which fuel is supplied, i.e., the discharge side 423 of the fuel supply portion 420 and the discharge side 413 of the AOG supply portion 410 are aligned with respect to the discharge side 333 of the combustion air supply portion 330 in the combustion air portion 330.

The discharge holes 415 in the extended portions 418 of the AOG supply portion 410 and fuel discharge holes 325 at the discharge side 423 of the fuel supply portion 420 may be arranged in a circle. The AOG and the combustion fuel are discharged from the circle and may be mixed uniformly.

A plurality of first supply portions 435 and a plurality of second supply portions 436 are formed in the internal tube 332 of the combustion air supply portion 330 and are separated from one another in a direction in which the fuel is discharged, i.e., the first supply portions 435 may be arranged in a position that is close to the discharge side 423 of the fuel supply portion 420, and the second supply portions 436 may be formed to be close to the discharge side 333 of the combustion air supply portion 330. Although not shown, other supply portions may be further formed between the first supply portions 435 and the second supply portions 436. Each of the first supply portions 435 and the second supply portions 436 may be formed as tubes each having a small diameter.

Combustion gas supplied from the fuel supply portion 420 and the AOG supply portion 410 is primarily burned by oxygen that is supplied from the first supply portions 435, and unburned gas is secondarily burned by oxygen that is supplied from the second supply portions 436. Thus, combustion efficiency of the fuel reformer burner 400 may be increased.

Figure 6:
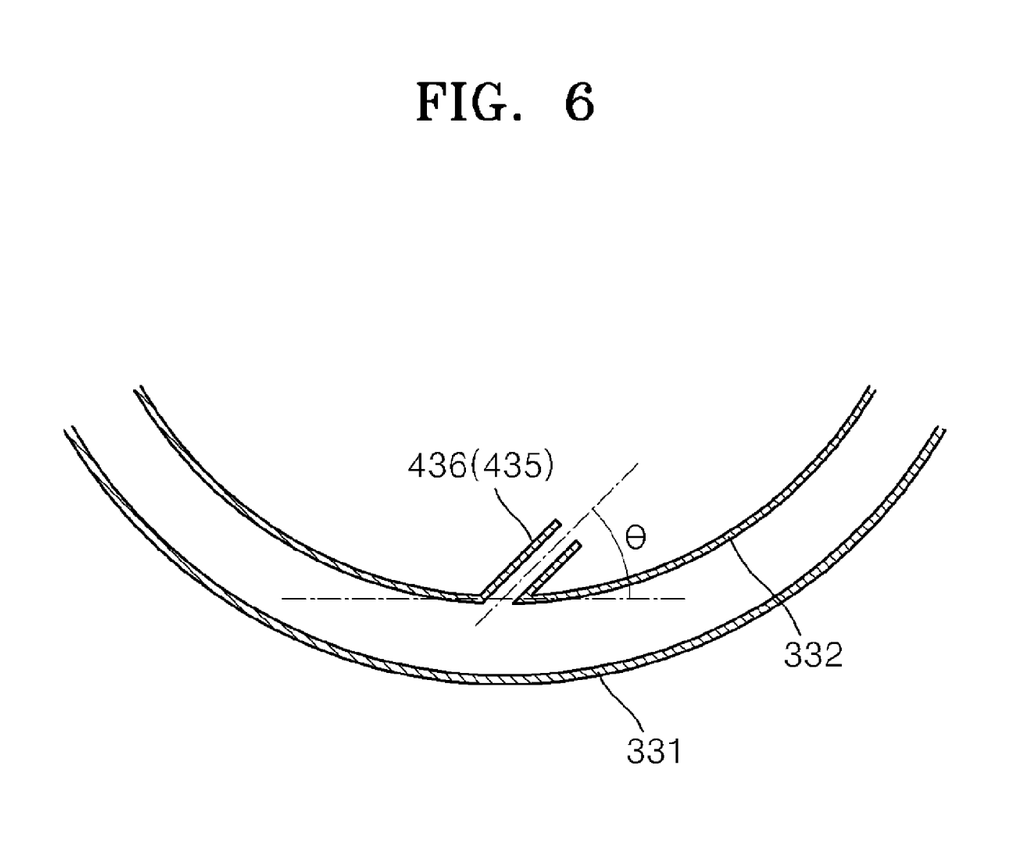
FIG. 6 illustrates a plurality of first and second supply portions according to an exemplary embodiment.

FIG. 6 illustrates a plurality of first and second supply portions according to an exemplary embodiment. Referring to FIG. 6, each of the first supply portions 435 and the second supply portions 436 may be formed at an angle θ of about 25° to about 60° with reference to a tangent line tangent to the internal tube 332 of the combustion air supply portion 330 at a portion thereof at which the first supply portions 435 and the second supply portions 436 are formed. Each of the first and second supply portions 435 and 436 may be formed at the same angle. If each of the first and second supply portions 435 and 436 is formed at an angle of less than about 25°, air from the first and second supply portions 435 and 436 may contact the internal tube 332 of the combustion air supply portion 330, thus, air pressure may be reduced. When each of the first and second supply portions 435 and 436 is formed at an angle of more than about 60°, there may be no difference between the first and second supply portions 435 and 436 and the first and second air supply holes 335 and 336 of FIG. 3.

The first and second supply portions 435 and 436 form an eddy current flow within the internal tube 332 of the combustion air supply portion 330, and mixture between oxygen and the combustion gas is increased, thus combustion efficiency is increased.

In the fuel reformer burner according exemplary embodiments, hydrogen gas that is discharged from the discharge holes contacts oxygen (air) so that combustion efficiency may be increased. In particular, hydrogen contained in the AOG does not contact oxygen in the AOG supply pipe and thus contacts oxygen after discharging therefrom so that combustion is performed. Thus, diffusion combustion occurs, and as such, a backfire toward the fuel reformer burner may be prevented when hydrogen gas having a fast combustion speed is burned.

Although a few embodiments have been shown and described, it would be appreciated by those skilled in the art that changes may be made in these exemplary embodiments without departing from the principles and spirit thereof, the scope of which is defined in the claims and their equivalents.

What is claimed is:

1. A fuel reformer burner for a fuel reformer of a fuel cell, the fuel reformer burner comprising:
a fuel supply portion to which a fuel for the fuel reformer is supplied and from which the fuel is discharged into the fuel reformer burner, the fuel being discharged from a discharge side of the fuel supply portion;
an anode-off-gas (AOG) supply portion to which an AOG is supplied from the fuel cell stack and from which the AOG is discharged into the fuel reformer burner, the AOG being discharged from a discharge side of the AOG supply portion; and
a combustion air supply portion to which combustion air is supplied and from which the combustion air is discharged into the fuel reformer burner,
wherein the fuel supply portion and the AOG supply portion are arranged inside the combustion air supply portion, and the combustion air supply portion is formed to extend beyond the discharge sides of the fuel supply portion and the AOG supply portion, and the AOG supply portion is arranged inside the fuel supply portion, and a portion of the AOG supply portion at the discharge side of the AOG supply portion is extended toward the fuel supply portion to form a plurality of extended portions and a plurality of discharge holes are formed in each of the extended portions and the discharge side of the fuel supply portion.

2. The fuel reformer burner of claim 1, wherein a plurality of first air supply holes is formed in a circumference of an internal surface of the combustion air supply portion at a first position that is close to the discharge side of the fuel supply portion, and a plurality of second air supply holes is formed in a circumference of the internal surface of the combustion air supply portion at a second position that is separated from the first position and that is farther away from the discharge side of the fuel supply portion.

3. The fuel reformer burner of claim 2, further comprising supply portions formed at the plurality of the first air supply holes and the plurality of the second air supply holes to supply a flow of air toward an inside of the combustion air supply portion.

4. The fuel reformer burner of claim 3, wherein the supply portions are formed at an angle of about 25° to about 60° with reference to a tangent line tangent to the combustion air supply portion at a portion thereof at which the supply portions are formed.

5. The fuel reformer burner of claim 1, wherein the discharge side of the AOG supply portion is formed at a same plane with the discharge side of the fuel supply portion.

6. The fuel reformer burner of claim 1, wherein the plurality of the discharge holes of the fuel supply portion are together arranged to form a circle.

7. The fuel reformer burner of claim 2, further comprising:
a flange fixed on an outer circumference of the combustion air supply portion; and
a screw coupling unit connected to the flange to fix a distance between the flange and a fuel reformer housing.

* * * * *

UNITED STATES PATENT AND TRADEMARK OFFICE
CERTIFICATE OF CORRECTION

PATENT NO. : 8,328,885 B2
APPLICATION NO. : 12/608140
DATED : December 11, 2012
INVENTOR(S) : Hyun-Chul Lee et al.

It is certified that error appears in the above-identified patent and that said Letters Patent is hereby corrected as shown below:

Column 8, claim 6, line 59, after "the" insert --AOG supply portion and the plurality of the discharge holes of the--.

Signed and Sealed this
Twelfth Day of February, 2013

Teresa Stanek Rea
*Acting Director of the United States Patent and Trademark Office*